US010838626B2

(12) United States Patent
Jia et al.

(10) Patent No.: US 10,838,626 B2
(45) Date of Patent: Nov. 17, 2020

(54) METHODS, APPARATUSES, AND COMPUTER PROGRAM PRODUCTS FOR CONTROLLING WRITE REQUESTS IN STORAGE SYSTEM

(71) Applicant: EMC IP Holding Company LLC, Hopkinton, MA (US)

(72) Inventors: Ruiyong Jia, Beijing (CN); Xinlei Xu, Beijing (CN); Yousheng Liu, Beijing (CN); Jian Gao, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 16/247,948

(22) Filed: Jan. 15, 2019

(65) Prior Publication Data
US 2019/0220201 A1     Jul. 18, 2019

(30) Foreign Application Priority Data
Jan. 18, 2018    (CN) .......................... 2018 1 0049237

(51) Int. Cl.
    *G06F 12/00*        (2006.01)
    *G06F 3/06*         (2006.01)
    *G06F 12/0871*     (2016.01)
    *G06F 12/02*       (2006.01)

(52) U.S. Cl.
CPC .......... *G06F 3/0611* (2013.01); *G06F 3/0653* (2013.01); *G06F 3/0659* (2013.01); *G06F 3/0689* (2013.01); *G06F 12/023* (2013.01); *G06F 12/0871* (2013.01); *G06F 2212/604* (2013.01); *G06F 2212/7202* (2013.01)

(58) Field of Classification Search
CPC .... G06F 3/0611; G06F 3/0653; G06F 3/0659; G06F 3/0689; G06F 12/023; G06F 12/0871; G06F 2212/604; G06F 2212/7202
See application file for complete search history.

(56) References Cited

U.S. PATENT DOCUMENTS

| | | |
|---|---|---|
| 7,062,675 B1 | 6/2006 | Kemeny et al. |
| 8,364,858 B1 | 1/2013 | Martin et al. |
| 9,563,423 B1 | 2/2017 | Pittman |
| 9,645,628 B1 | 5/2017 | Loafman et al. |
| 9,647,905 B1 | 5/2017 | Pittman |

(Continued)

*Primary Examiner* — Shawn X Gu
(74) *Attorney, Agent, or Firm* — BainwoodHuang

(57) ABSTRACT

In certain techniques, a size of a storage space in a first storage device that is allocated for write requests is determined. Write requests are issued by a control device of the storage system to store data into the first storage device and are waiting to be completed. A predetermined release rate of releasing the data stored in the first storage device to a second storage device is determined. An access speed of the first storage device is greater than that of the second storage device. A predetermined completion time of the write requests is determined based on the size of the storage space and the predetermined release rate, and in response to the predetermined completion time exceeding a predetermined time threshold, a throttling indication is transmitted to the control device such that the control device throttles issuing of a further write request for the first storage device.

24 Claims, 5 Drawing Sheets

(56) References Cited

U.S. PATENT DOCUMENTS

| | | |
|---|---|---|
| 9,652,307 B1 | 5/2017 | Soman et al. |
| 9,712,427 B1 | 7/2017 | Pittman |
| 9,747,222 B1 | 8/2017 | Armangau et al. |
| 9,811,288 B1 | 11/2017 | Chen et al. |
| 10,338,834 B1 * | 7/2019 | Dighe .................. G06F 3/0622 |

* cited by examiner

METHODS, APPARATUSES, AND COMPUTER PROGRAM PRODUCTS FOR CONTROLLING WRITE REQUESTS IN STORAGE SYSTEM

FIELD

Embodiments of the present disclosure relate to the field of data storage, and more particularly, to methods, apparatuses, and computer program products for controlling write requests in a storage system.

BACKGROUND

A storage system may be built on one or more physical storage devices for providing a data storage capability. Generally, the storage system includes a storage controller for controlling input/output (I/O) requests of the storage system, including read requests, write requests, delete requests and so on, to perform data writing, reading and deleting in the storage system. When performing a data write operation, after receipt of a write request from a host or client, the data to be written are first buffered in a cache memory of the storage system (such as a cache), and then are written into a hard disk device by the cache memory. In this way, as the access speed of the cache memory is often higher than that of the hard disk device, it is possible to provide a quick response to the write request from the host or client. In addition, it is also possible to provide the client with transactional writing with atomicity, consistency, isolation, and persistence (ACID) attributes by means of the cache memory. Such storage structure is also beneficial to other I/O operations.

However, the mismatch between the access speeds of the cache memory and the hard disk device may lead to the problem of cache overflow. In these cases, due to the high access speed of the cache memory, the cache memory will receive too many write requests; however, since data writing from the cache memory to the hard disk device is limited by the access speed of the hard disk device, the cache memory will delay the received write requests. If there are too many write requests delayed in the cache memory and the delay time is too long, it may trigger failure monitoring of the storage system.

SUMMARY

Embodiments of the present disclosure provide a solution for controlling write requests in a storage system.

In a first aspect of the present disclosure, there is provided a method of controlling write requests in a storage system. The method includes: determining a size of a storage space in a first storage device that is allocated for a plurality of write requests. The plurality of write requests are issued by a control device of the storage system to store data into the first storage device and are waiting to be completed. The method further includes determining a predetermined release rate of releasing the data stored in the first storage device to a second storage device, an access speed of the first storage device being greater than that of the second storage device. The method further includes determining a predetermined completion time of the plurality of write requests based on the size of the storage space and the predetermined release rate, and in response to the predetermined completion time exceeding a predetermined time threshold, transmitting a throttling indication to the control device such that the control device throttles issuing of a further write request for the first storage device.

In a second aspect of the present disclosure, there is provided a method of controlling write requests in a storage system. The method includes transmitting a plurality of write requests for a first storage device. The plurality of write requests are to be processed to store data into the first storage device and the first storage device releases the stored data to a second storage device, an access speed of the first storage device being greater than that of the second storage device. The method further includes: in response to receiving a throttling indication, throttling issuing of a further write request for the first storage device.

In a third aspect of the present disclosure, there is provided an apparatus for controlling write requests in a storage system. The apparatus includes a processor and a memory coupled to the processor, the memory having instructions stored thereon. The instructions, when executed by the processor, cause the apparatus to perform acts including: determining a size of a storage space in a first storage device that is allocated for a plurality of write requests. The plurality of write requests are issued by a control device of the storage system to store data into the first storage device and are waiting to be completed. The acts further include determining a predetermined release rate of releasing the data stored in the first storage device to a second storage device. The access speed of the first storage device is greater than that of the second storage device. The acts further include determining a predetermined completion time of the plurality of write requests based on the size of the storage space and the predetermined release rate; and in response to the predetermined completion time exceeding a predetermined time threshold, transmitting a throttling indication to the control device such that the control device throttles issuing of a further write request for the first storage device.

In a fourth aspect of the present disclosure, there is provided an apparatus for controlling write requests in a storage system. The apparatus includes a processor and a memory coupled to the processor, the memory having instructions stored thereon. The instructions, when executed by the processor, cause the apparatus to perform acts including: transmitting a plurality of write requests for a first storage device. The plurality of write requests are to be processed to store data into the first storage device and the first storage device releases the stored data to a second storage device, an access speed of the first storage device being greater than that of the second storage device. The acts further include: in response to receiving a throttling indication, throttling issuing of a further write request for the first storage device.

In a fifth aspect of the present disclosure, there is provided a computer program product being tangibly stored on a computer readable medium and including machine executable instructions which, when executed, cause a machine to perform the method according to the first aspect of the present disclosure.

In a sixth aspect of the present disclosure, there is provided a computer program product being tangibly stored on a computer readable medium and including machine executable instructions which, when executed, cause a machine to perform the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refer to the like elements in the example embodiments of the present disclosure.

DETAILED DESCRIPTION OF EMBODIMENTS

Figure 1:
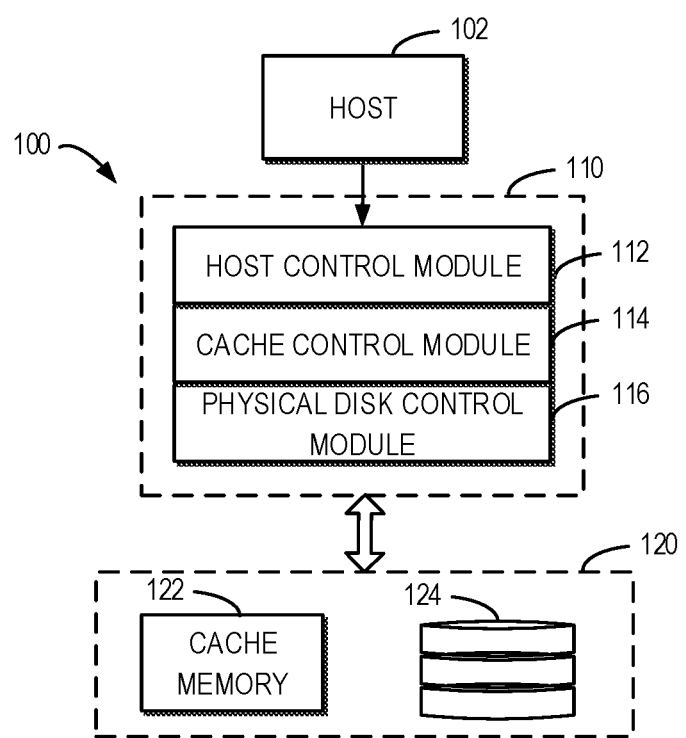
FIG. 1 is a schematic diagram illustrating an environment in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open-ended terms that mean "include but are not limited to." The term "or" is to be read as "and/or" unless explicitly being defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can represent different or the same objects. Other definitions, either explicit or implicit, may be included below.

FIG. 1 is a schematic diagram illustrating a storage system 100 in which embodiments of the present disclosure may be implemented. The storage system 100 includes a physical storage device group 120 for providing a data storage capability. The physical storage device group 120 includes a cache memory 120 for data cache and hard disk devices 124 for persistent data storage. Generally, an access speed of the cache memory 122 is greater than that of the hard disk devices 124. The storage system 100 may provide the data storage capability using a plurality of storage technologies.

In some embodiments, examples of the cache memory 122 include a memory having a high access speed, such as a cache, a random access memory (RAM), a dynamic random access memory (DRAM), and the like. Examples of the hard disk devices 124 may include, but are not limited to, digital versatile disks (DVDs), Blue-ray disks (BDs), compact disks (CDs), floppy disks, hard disk devices, tape drivers, optical drivers, hard disk drivers (HDDs), solid-state storage devices (SSDs), redundant arrays of independent disks (RAIDs), or other hard disk devices.

To manage data storage of the physical storage space, the storage system 100 further includes a storage controller 110. Typically, the storage system 100 adopts a layered control model. As illustrated in FIG. 1, under the layered control model, the storage controller 110 may have multiple layers of control modules, including a host control module 112, a cache control module 114 and a physical disk control module 116. These control modules provides a functionality of layered control.

To facilitate understanding of the layered control model of the storage system 100, the working mechanism of the controller 110 is described in the example using RAID technology. The physical disk control module 116 exposes RAID logic unit numbers (LUNs) to the cache control module 114. The physical disk control module 116 controls the storage space of the hard disk devices 124. The cache control module 114 controls the cache space of the cache memory 122 to expose the cache volumes to the host control module 112. The host control module 112 manages the logic storage pool and exposes the pool LUNs to the host 102 (e.g., an external host computer).

During operation, the host 102, such as an application operating on the host 102, transmits (or provides) a user write request to the host control module 112 to request for writing data into the storage system 100. In response to the received user write request, the host control module 112 may probably generate a plurality of write requests for the cache control module 114. For example, if the user write request from the host 102 requires writing a large amount of data into a plurality of discrete segments of a RAID LUN created by the hard disk devices 124, the host control module 112 will transmit a write request for each segment to the cache control module 114.

The cache control module 114 and the cache memory 122 operate in a write-back mode, which means that after receipt of a write request, the cache control module 114 first caches data to be written by the write request into the cache memory 122, and then releases data for the write request(s) into the hard disk device 140. The cache control module 114 may transmit a completion indication of that write request to the host control module 112 upon completion of data cache so as to provide a quick response to the user write request. The physical disk control module 116 is used to control the actual writing to the hard disk devices 124.

It would be understood that although being illustrated as different modules, the host control module 112, the cache control module 114 and the physical disk control module 116 may be implemented by one or more processors, controllers, microprocessors having the processing capability or a computing device including the above devices. In some examples, the cache control module 114 may be integrated with the cache memory 122 to provide a device having both cache and control capabilities. Although not shown, in some embodiments, the storage system 100 may also include another storage controller as a mirror of the storage controller 100, so as to provide data consistency, security and data restoration capability. In some examples, the storage system 100 may further use a multi-core storage mechanism for data storage and management.

The cache memory is often used in a storage system to perform data caching before data are written into a hard disk device. However, generally the access speed of the cache memory is greater than that of a hard disk device, which will lead to a large number of write requests to be transmitted to a cache control module of the cache memory. However, due to the limited cache space, these requests may not be processed quickly, which leads to a problem of cache overflow. In this case, write throttling is required to be performed. It is to be understood that although write throttling is discussed in the example that the cache memory and the hard disk devices have different access speeds, it may occur in any other storage systems having a similar structure.

In a conventional solution, the write throttling is completely implemented and controlled by the cache control module. The cache control module enters a write throttling mode and implements the write throttling by delaying completion indications for write requests. Specifically, after a write request is received, the cache control module implements this write request. If this write request is a cache-miss write request, the cache control module allocates a cache space to the write request and writes data into the corresponding cache space. When it is in the write throttling state, the cache control module will not transmit the completion indication for this write request to the originator of this write request, such as the host control module, but will put the write request into a delay queue. If the write request is a cache-hit write request, the cache control module will not need to allocate a new storage space for this write request, and thus will not perform write throttling for the cache-hit write request, but instead, will transmit an completion indication for this write request directly to the host control module. When the cache control module performs data releasing to release data in the cache memory to the hard disk device, the cache control module determines (or ascertains), based on the released cache space, whether it can wake up a write request in the delay queue, and then transmit a completion indication for the woken write request to the host control module.

Under write throttling, the host control module will not take active actions, even though the host control module is actually the source who causes the cache overflow. Depending on the workload of the host, there are many threads in the host control module to transmit write requests to the cache control module. Although the number of the write requests issued by the host control module are large and changes with time, for sake of consistency of the threads, some threads may not be able to continue to issue subsequent write requests but have to wait because completion indications for write requests issued previously is not received. In this way, the conventional solution can gradually suppress the issuing of write requests by the host control module by delaying the completion indications for the write requests by the cache control module. However, this process may be rather time-consuming. During this period of time, the cache control module may still receive a large amount of write requests. Thus, write throttling in the conventional solution is low-efficient and has poor effect. Depending on the flush rate of the cache memory and the number of write requests in the delay queue, the completion of these write requests may be delayed for a long time.

Further, from the perspective of the host control module, since many write requests issued from it cannot be completed for a long time (because it does not receive any completion indication), the host control module may consider that there is a failure in the cache control module or cache memory that cause significant reduction of the completion speeds of the write requests. If a write operation cannot be completed in a predetermined period of time, the host control module or the host may issue an alert of I/O failure. The actual reason for this condition is due to cache overflow occurred before the host control module throttles the write requests in time. However, the host control module is unable to learn this fact in the conventional solution.

In accordance with embodiments of the present disclosure, there is provided a solution for controlling write requests in a storage system. In this solution, it is determined a predetermined completion time of a plurality of uncompleted write requests in the first storage device having a high access speed. The predetermined completion time is determined (or identified) based on a size of a storage space allocated for the plurality of write requests and a predetermined release rate of releasing data from the first storage device to the second storage device having a low access speed. If the predetermined completion time exceeds a predetermined time threshold, a throttling indication is transmitted to a control device that transmits write requests to the first storage device, such that the control device throttles a further write request transmitted to the first storage device. By transmitting the throttling indication, the control device can actively throttle issuing of subsequent write requests, thereby achieving effective write throttling.

Figure 2:
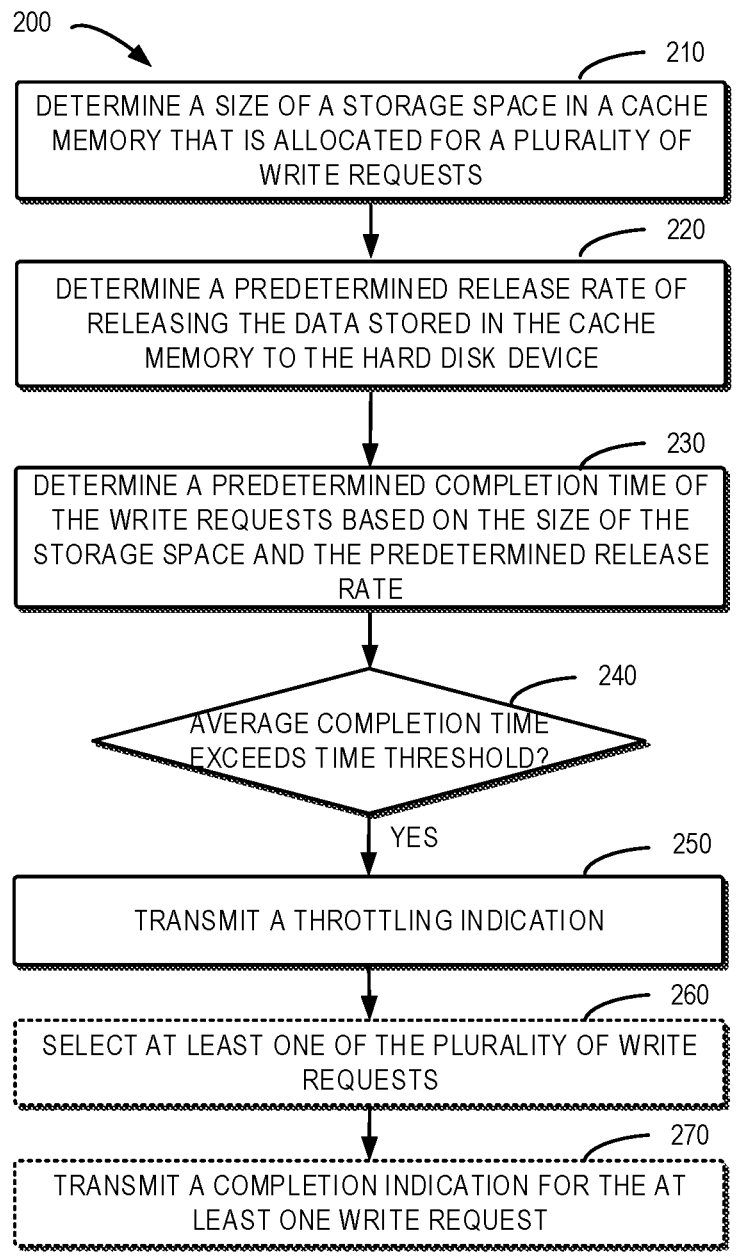
FIG. 2 is a flowchart illustrating a process of controlling write requests in accordance with an embodiment of the present disclosure.

Embodiments of the present disclosure will be described below in detail with reference to the drawings. FIG. 2 is a flowchart illustrating a process 200 of controlling write requests in a storage system in accordance with an embodiment of the present disclosure. The process 200 may be implemented by a control device/controller of the storage system, particularly by a controlling module in the controller that is used for managing a storage device having a high access speed. For sake of discussion, the process 200 will be described with reference to FIG. 1. In this example, the process 200 may be implemented at the cache control module 114 because the access speed of the cache memory 122 managed by the cache control module 114 is greater than that of the hard disk device(s) 124.

At 210, the cache control module 114 determines (or identifies) a size of a storage space allocated for a plurality of write requests in the cache memory 122 (also referred to as a first storage device for sake of discussion). The plurality of write requests are write requests waiting to be completed in the cache memory 122. These write requests are issued by a control device of the storage system to store data into the cache memory 122. The cache memory 122 may be, for example, a cache or other storage devices having a high access speed. In the storage system 100, the control device transmitting write requests to the cache memory 122 is the host control module 112. The host control module 112 may transmit a write request for the cache memory 122 to the cache control module 114 in response to a user write request from the host. In some examples, a user write request from the host may trigger the host control module 112 to transmit a plurality of write requests. Depending on the specific user write request, the host control module 112 may transmit to the cache control module 114 one or more write request or one or more write-zero requests.

In the normal operation mode, after receipt of a write request, the cache control module 114 executes that write request, allocates a corresponding storage space (i.e., a cache space) to the write request as required, and stores the data to be written in the allocated storage space. Whether storage space is allocated depends on whether the write request is a cache-hit write request or a cache-miss write request. If this write request is a cache-hit write request, there is no need to allocate the storage space and the cache control module 114 transmits a completion indication for the write request directly to the host control module 112 such that the write request is completed. If the write request is a cache-miss write request, after the storage space is allocated and the data is stored, the cache control module 114 will also transmit a completion indication for the write request to the host control module 112. Therefore, in the normal operation mode, the write request transmitted to the cache control module 114 will be completed quickly.

However, due to lack of cache space, the slow speed of releasing the cached data to the hard disk device 124 and so on, the cache control module 114 may enter the throttling mode. In the throttling mode, after receiving and executing the write request, the cache control module 114 will not transmit a completion indication for this write request immediately but will let the completion of the write request pending. The cache control module 114 may manage a delay queue and put the uncompleted write request into the delay queue to wait for the completion by the cache control module 114. In some embodiments, for a plurality of write requests in the delay queue, it is determined the size of the storage space allocated for these requests. The size of the storage space is related to the number of write requests waiting to be completed and the storage space allocated for each write request. The size of the storage space may be a sum of storage spaces allocated for respective write requests, which may be measured by the number of cache pages in the example of cache. If a new write request is added to the delay queue or a write request in the delay queue is completed, the determined size of the storage space will be updated, which will be discussed in detail below.

At 220, the cache control module 114 determines (or indicates) a predetermined release rate of releasing data stored in the cache memory 122 to the hard disk device 124 (for sake of discussion, also referred to as a second storage device). In the storage system 100, the access speed of the hard disk device 124 is lower than the cache memory 122 and may be used to store data released from the cache memory 122. A page in the cache memory 122 is referred to as a dirty page and data therein are referred as dirty data. The cache control module 114 writes dirty data into the hard disk device 124 based on the configured cache flush mechanism so as to release the storage space of the cache memory 122. The release rate refers to an amount of data released from the cache memory 122 to the hard disk device 124 per unit time. In an example, if the cache page is used as a unit to measure the size of the storage space, the amount of released data may be converted to be in the unit of cache pages and the number of cache pages released per unit time is calculated as the release rate. In some embodiments, the predetermined release rate determined for the write request waiting to be completed may be determined based on the release rate for of releasing data from the cache memory 122 to the hard disk device 124, which will be discussed below in detail.

At 230, the cache control module 114 determines a predetermined completion time of the plurality of write requests based on the size of the storage space and the predetermined release rate. The predetermined completion time indicates the time to be cost to complete the write requests in the delay queue in the current state of the cache memory 122. If it is assumed that the storage space allocated for these write requests is represented as $Page_{throttle\_miss}$ and the predetermined release rate is represented as $Throughput_{avg}$, then the predetermined completion time may be calculated as: $Time_{throttle\_predict} = Page_{throttle\_miss}/Throughput_{avg}$.

At 240, the cache control module 114 determines whether the predetermined completion time exceeds a predetermined time threshold. The predetermined time threshold may be an upper limit for a completion time of a single write request, which may be configured in advance by the system or configurable by the user, indicating that a single write request for the cache memory is expected to be completed within this period of time. Therefore, the predetermined time threshold may be used to guarantee the quality of service for the completion of the write request. The predetermined time threshold may be configured as any suitable value based on the requirement for the quality of service. The cache control module 114 will ensure that all the received write requests are completed within this predetermined time threshold.

If the predetermined completion time exceeds the predetermined time threshold, it means that the write request (for example, the earliest write request) in the delay queue has waited for a long time. Then, at 250, the cache control module 114 transmits a throttling indication to the host control module 112 such that the host control module 112 throttles issuing of a further write request for the cache memory. By transmission of the throttling indication, the host control module 112 may be aware of the throttling mode of the cache control module 114 and thus can proactively reduce or terminate issuing of write requests to the cache control module 114 so as to avoid a long delay of the write requests.

In some embodiments, if the predetermined completion time exceeds the predetermined time threshold, at 260, the cache control module 114 may further select at least one write request from the plurality of write requests in the delay queue. At 270, the cache control module 114 transmits a completion indication for the at least one write request to the host control module 112 so as to enable at least one write request to be completed. In some embodiments, the cache control module 114 may select a write request with a longer waiting time in the delay queue, such as the write request with the longest waiting time (i.e., the oldest write request). The cache control module 114 may also select and complete two or more write requests based on the waiting time if possible. In some embodiments, the cache control module 114 may transmit the completion indication for the at least one write request together with the above throttling indication to the host control module 112.

In some embodiments, since the write requests in the delay queue are all cache-miss write requests, the completion indications for these write requests may be distinguished from the completion indications for the cache-hit write requests. For example, the host control module 112 may identify whether a completion indication is a completion indication for a cache-miss write request by configuring a special identifier in the completion indication.

In some embodiments, if the cache control module 114 determines at 240 that the predetermined completion time does not exceed the predetermined time threshold, the cache control module 114 may perform completion of the write requests based on other policies, for example, implement cache flush based on a predetermined policy so as to wait for more cache space to be released. In some embodiments, the hard disk devices 124 of the storage system 100 may be organized as a plurality of RAID groups which are managed separately. In this case, for each of the RAID groups, the above process 200 may be executed to achieve throttling of write requests in the cache control module 114.

The cache control module 114 may determine the predetermined completion time of the uncompleted write requests in the delay queue dynamically so as to determine whether to transmit a throttling indication and whether to complete the write requests in the delay queue. As can be understood from the above discussion, the two factors affecting the predetermined completion time include the size of the storage space allocated for the plurality of uncompleted write requests and the predetermined release rate from the cache memory 122 to the hard disk device 124. If either of the two factors changes, the determined predetermined completion time may also change.

Figure 3:
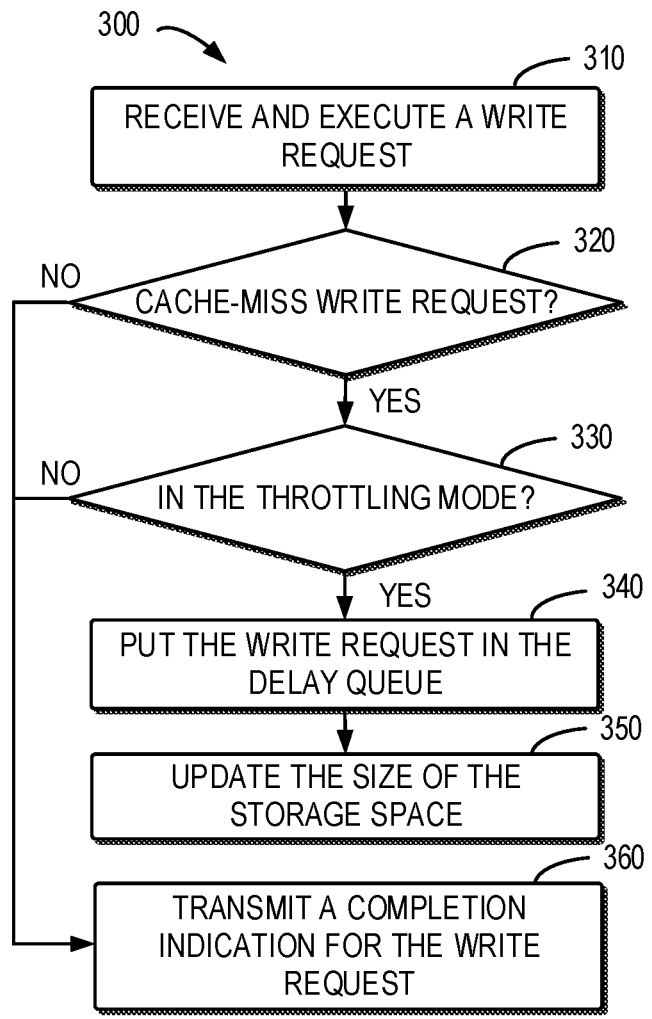
FIG. 3 is a flowchart illustrating a process of updating a size of a storage space in accordance with an embodiment of the present disclosure.

During operation, the cache control module 114 may maintain a real-time value of the size of the storage space $Page_{throttle\_miss}$. According to the definition of the size of the storage space, the change of the size of the storage space is determined by the number of uncompleted write requests and the storage space allocated for each of the write requests. Therefore, if the write requests in the delay queue of the cache control module 114 are completed, for example, one or more write requests are selected and completed during the process 200, then the cache control module 114 may reduce the determined size of the storage space $Page_{throttle\_miss}$ accordingly. For example, if a selected completed write request is allocated with n pages, the size of the storage space $Page_{throttle\_miss}$ may be reduced by n. In other cases, if the cache control module 114 locates a new write request into the delay queue, the determined size of the storage space $Page_{throttle\_miss}$ may also be increased accordingly. FIG. 3 illustrates a process 300 for updating the size of the storage space in these cases. The process 300 may be regarded as a specific example of determining the size of the storage space in the process 200.

At 310, the cache control module 114 receives a write request from the host control module 112 and execute the received write request. As mentioned above, the cache control module 114 may allocate a corresponding storage space (i.e., a cache space) to the write request as required and store data to be written into the allocated storage space. Whether the storage space is allocated depends on whether the write request is a cache-hit write request or a cache-miss write request. At 320, the cache control module 114 determines whether the received write request is a cache-miss write request or not. If this write request is not a cache-miss write request but a cache-hit write request, then there is no need to allocate a new cache space for this write request. The cache control module 114 transmits a completion indication for the write request directly to the host control module 112 so as to enable this write request to be completed. In some embodiments, the cache control module 114 may configure the completion indication to explicitly indicate to the host control module 112 whether the completion indication is a completion indication for a cache-hit write request.

If this write request is a cache-miss write request, then it is needed to allocate a corresponding cache space (for example, a cache page(s)) to that write request. In addition, the cache control module 114 further determines at 330 whether it is in the throttling mode. If so, the cache control module 114 may expect to limit the issuing of write requests by the host control module 112. Whether it is in the throttling mode may depend on the throttling mechanism of the cache control module 114, which may be related to the remaining available cache space of the cache memory 122 and/or the release rate of releasing data from the cache memory 122 to the hard disk device 124. This can be determined by another mechanism of the cache control module 114. If the cache control module 114 is not in the throttling mode, at 360, it may transmit a completion indication for the write request to the host control module 112 directly so as to enable the write request to be completed.

If the cache control module 114 is in the throttling mode, at 340, it puts the currently received write request into the delay queue in which the write request waits to be completed. As the number of write requests in the delay queue increases, at 350, the cache control module 114 updates the size of the storage space $Page_{throttle\_miss}$. For example, if it is assumed that this write request is to be allocated with n cache pages, then the size of the storage space $Page_{throttle\_miss}$ may be increased by n.

After determining the size of the updated storage space $Page_{throttle\_miss}$, the cache control module 114 may determine the current predetermined completion time based on that size so as to determine whether to transmit a throttling indication to the host control module 112 and/or whether to select one or more write requests in the delay queue to be completed.

In accordance with embodiments of the present disclosure, if the cache control module 114 and the cache memory 122 are already in the throttling mode, when the cache control module 114 further receives a write request, the predetermined completion time of the currently uncompleted write requests may be determined dynamically, so as to notify the host control module 112 of throttling the issuing of write requests as soon as possible and to complete the write requests that have waited for a long time within the predetermined time threshold that meets the requirement for the quality of service.

Figure 4:
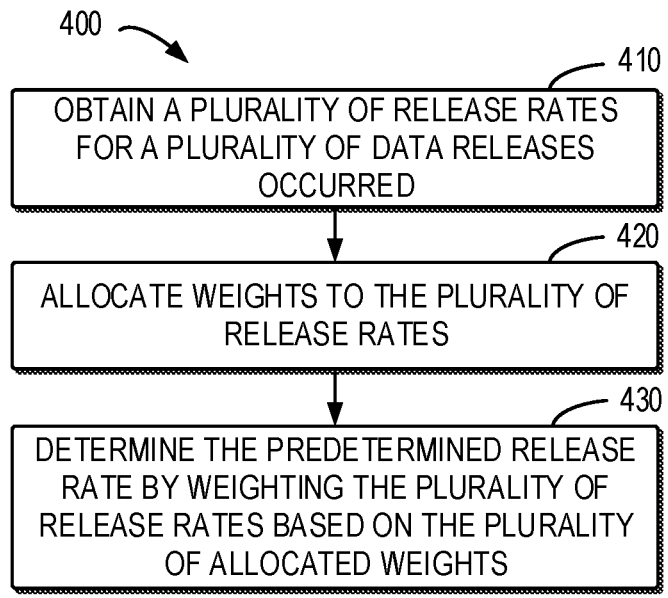
FIG. 4 is a flowchart illustrating a process of updating a predetermined release rate in accordance with an embodiment of the present disclosure.

In some embodiments, in addition to the size of the storage space of the uncompleted write requests, the cache control module 114 may further maintain a real-time value of the predetermined release rate $Throughput_{avg}$. As mentioned above, the predetermined release rate may be determined based on the release rate of occurred data release from the cache memory 122 to the hard disk device 124 (i.e., cache flush). Therefore, each time a data release is occurred, the cache control module 114 may calculate the predetermined release rate again. FIG. 4 illustrates a process 400 for determining the predetermined release rate. The process 400 may be regarded as a specific example of determining the predetermined release rate in the process 200. Each time it is occurred data release from the cache memory 122 to the hard disk device 124, the process 400 will be triggered to perform.

At 410, the cache control module 114 obtains a plurality of release rates of a plurality of data releases occurred from the cache memory 122 to the hard disk device 124. The data releases under consideration may be predetermined, such as previous three times, previous five times, previous ten times or any other number. The cache control module 114 may record the release rates of data releases that has already occurred. In some embodiments, if the storage system 100 uses a multi-core storage mechanism to implement data storage and management, then the release rate for each data release may be a sum of release rates of multiple cores.

At 420, the cache control module 114 allocates weights to the plurality of release rates, each weight indicating a contribution of the corresponding release rate to the predetermined release rate to be calculated. In some embodiments, these release rates may be considered in the manner of decaying average. Therefore, a release rate that is corresponding to a data release having a later occurrence time is allocated with a higher weight because this release rate reflects a more recent data release capability from the cache memory 122 to the hard disk device 124. In some embodiments, the release rate corresponding to the most recent data release may be allocated with the highest weight, and the weights allocated to the corresponding release rates are decreased progressively with the occurrence times. At 430, the cache control module 114 determines the predetermined release rate by weighting the plurality of release rates based on the plurality of allocated weights. The predetermined release rate may be a weighted average of the plurality of release rates.

By estimating the predetermined release rate of the uncompleted write requests in the delay queue using the historical release rates, the predetermined completion time of the write requests may be determined in a sound manner. In addition to taking the historical release rates into account through the above approach of decaying average, in some embodiments, it is also possible to take the release rates of the historical data releases equally. In other embodiments, the release rate of only a certain historical data release may be considered. For example, the predetermined release rate may be determined as equal to the corresponding release rate of the latest data release or any one of the one or more date releases that are occurred recently, or as a function of the release rates.

It has been discussed above the determination of the size of the storage space and the predetermined release rate and the determination of the expected completion time based thereon. As described with reference to FIG. 2, when determining that the predetermined completion time exceeds the predetermined time threshold, one or more write requests in the delay queue may be completed. In some embodiments, whether a write request can be completed also depends on whether there is a sufficient cache space in the cache memory 122.

Figure 5:
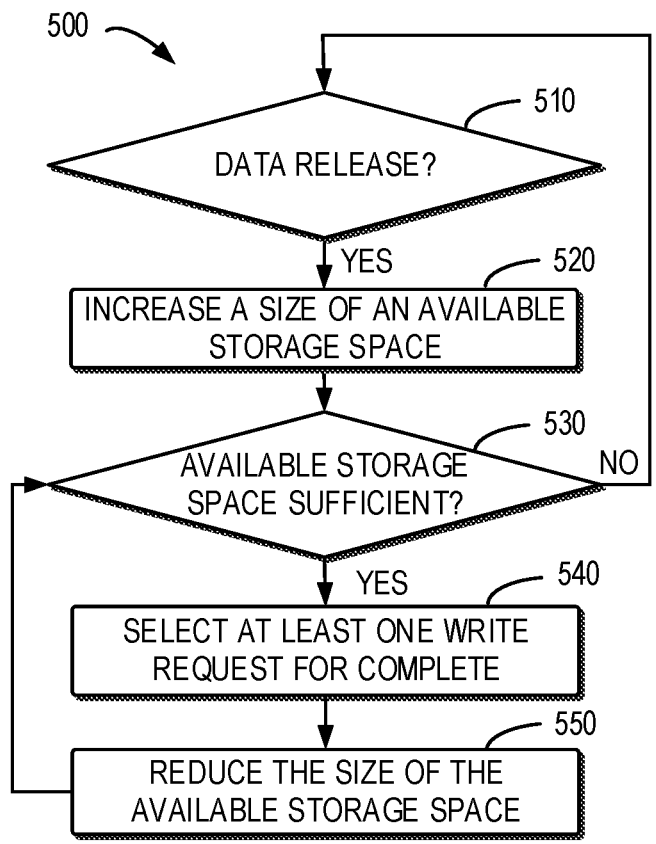
FIG. 5 is a flowchart illustrating a process of updating a size of an available storage space in accordance with an embodiment of the present disclosure.

FIG. 5 is a flowchart illustrating a process 500 of determining an uncompleted write request in the delay queue based on the size of the storage space. The process 500 may be regarded as a specific embodiment of selecting a write request in the process 200 for completion. The cache control module 114 may maintain a real-time value of the size of the available storage space of the cache memory 122 (represented as $N_{accumulate}$). The size of the available storage space may be, for example, represented by the number of cache pages.

At 510, the cache control module 114 monitors whether a data release from the cache memory 122 to the hard disk device 124 is occurred. If the data release is occurred, at 520, the cache control module 114 increases the size of the available storage space. For example, if it is assumed that the data release will release m cache pages of the cache memory 122, then the size of the currently available storage space $N_{accumulate}$ will be increased by m.

At 530, the cache control module 114 determines whether the available storage space is sufficient to complete at least one write request. Specifically, the cache control module 114 may select one or more write requests with the longer (or longest) waiting time based on the waiting times of the write requests in the delay queue, and then determine whether the size of the current available storage space $N_{accumulate}$ exceeds (for example, larger than or equal to) the size of the storage space allocated for the selected write requests (assumed to be $m_1$). If $N_{accumulate} \geq m_1$, at 540, the cache control module 114 may select those write requests to complete. Specifically, the cache control module 114 will fetch the write request(s) from the delay queue and transmit a completion indication for the write request(s) to the host control module 112.

As the write requests have been completed, at 550, the cache control module 114 reduces the size of the available storage space, for example, reduces $N_{accumulate}$ by $m_1$. Then the process 500 returns back to 530 at which the cache control module 114 continues to determine whether the size of the current available storage space is sufficient to continue to complete a write request. If the available storage space is not sufficient to complete a write request in the delay queue, the cache control module 114 may continue to monitor whether a data release from the cache memory 122 to the hard disk device 124 is occurred.

It is to be understood that although various processes are described in a specific order, these processes are not necessarily to be implemented in the order as shown. In some embodiments, some steps in any process in FIGS. 2-5 may be implemented in a different, reverse, or parallel order. For example, in the process shown in FIG. 2, the write requests may be selected first through the process shown in FIG. 5 and then it is determined whether the predetermined completion time exceeds the predetermined time threshold. Further, in the process 200, determining the size of the storage space and determining the predetermined release rate may be executed in a reverse order or in parallel. As stated, the throttling indication or the completion indication may also be transmitted to the host control module 112 together. During the process 300, the determination of cache-miss write requests and determination of the throttling mode may be executed in a reverse order or in parallel.

Figure 6:
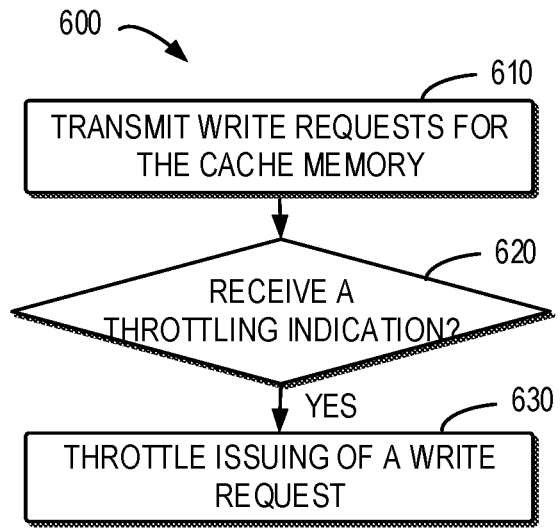
FIG. 6 is a flowchart illustrating a process of controlling write requests in accordance with another embodiment of the present disclosure.

It has been described above how the cache control module 114 controls the write requests. FIG. 6 is a flowchart illustrating a process 600 of controlling write requests implemented at the host control module 112. In accordance with embodiments of the present disclosure, the host control module 112, which transmits write requests to the cache control module 114, also throttles issuing of write requests proactively.

At 610, the host control module 112 transmits one or more write requests for the cache memory 122. These write requests may be issued by the host control module 112 in response to receiving a user write request from the host. At 620, the host control module 112 determines whether a throttling indication is received from the cache control module 114. If a throttling indication is received, at 630, the host control module 112 enters the throttling mode and throttles issuing of a further write request for the cache memory 122. If no throttling request is received, the host control module 112 may transmit the write request to the cache control module 114 in the normal mode.

As described above for the cache control module 114, the cache control module 114 ensures that the write request issued from the host control module 112 can be completed within a predetermined time threshold by determining the predetermined completion time dynamically. If the predetermined completion time exceeds the predetermined time threshold, the throttling indication will be transmitted by the cache control module 114 to the host control module 112 such that the host control module 112 can throttle subsequent write requests proactively. According to embodiments of the present disclosure, the cache control module 114 and the host control module 112 collaborate to achieve the throttling of the write requests.

In the throttling mode, the host control module 112 will reduce the frequency of issuing write requests to the cache control module 114 or terminate issuing of write requests until a completion indication is received. As mentioned above, the completion indication issued by the cache control module 114 may be identified especially such that the host control module 112 is able to determine whether the completion indication is for a cache-miss write request or a cache-hit write request. Therefore, if the host control module 112 receives a completion indication for the cache-hit write request after entering the throttling mode, it may still stay in the throttling mode.

In some embodiments, during the throttling mode, the host control module 112 may configure a predetermined number threshold to be used as an upper limit of the issued write requests. After completion indications of one or more write requests are received, it is determined whether there are only a small number of uncompleted write requests (lower than the predetermined number threshold). If the completion indication for at least one write request is received and the number of uncompleted write requests is lower than the predetermined number threshold (that is, the completion indications for these write requests are not received), the host control module 112 may transmit other write requests.

In a specific example, the host control module 112 may maintain the real-time number of issued write requests, and then set the upper limit for this number as a specific value (namely, the predetermined number threshold). This predetermined number threshold may be selected as any value. If the host control module 112 transmits a write request to the cache control module 114, the number of write requests will be increased by 1. If the host control module 112 receives a completion indication for a write request from the cache control module 112, the number of write requests will be reduced by 1. When the number of the write requests reaches the predetermined number threshold, the host control module 112 will not issue write requests. In this manner, the host control module 112 may control the number of issued write requests within the predetermined number threshold so as to obtain effective write throttling.

In some embodiments, the host control module 112 may also maintain a queue and put into this queue the write requests generated in response to the user write request from the host so as to wait for the time when the requests can be transmitted to the cache control module 114. In some cases, in response to a user write request from the host, the host control module 112 may generate a read request(s) and/or a write-zero request(s) in addition to the write request(s). The host control module 112 may not throttle the read requests and write-zero requests but transmit these read and write requests directly to the cache control module.

In some embodiments, the hard disk devices 124 of the storage system 100 may be organized as a plurality of RAID groups which are managed separately. In this case, for each of the RAID groups, the host control module 112 may receive a throttling indication for this RAID group and execute write throttling for this RAID group independently.

In some embodiments, the host control module 112, as a receiver of the user write request, may further maintain a completion time for the user write request. Typically, the host control module 112 sets a total completion time threshold for the user write request to monitor whether the user write request can be completed within this total completion time threshold. The completion of the user write request depends on the completion of one or more write requests, read requests, and/or write-zero requests for the cache control module triggered by the user write requests. In the conventional solution, this total completion time threshold is set as a fixed value. The host control module 112 or the host judges the writing performance of the cache memory 122 or storage system 100 based on whether the total completion time threshold is met.

In embodiments of the present disclosure, the cache control module 114 maintains the predetermined time threshold (represented above as $Time_{throttle\_predict}$) for a single write request. In some embodiments, instead of maintaining a fixed total completion time threshold, the host control module 112 may determine the total completion time threshold of each user write request (assumed to be represented as $Timeout_{watchdog}$) dynamically based on the predetermined time threshold of the single write request. Specifically, the host control module 112 may determine the number of write requests generated for the cache memory 122 in response to each user write request. The total completion time threshold may be determined as a product of the number of the write requests and the predetermined time threshold for each write request, or as this product plus a suitable offset. This may be represented as $Timeout_{watchdog} = N*T_{write\_max}+delta$, where N represents the number of generated write requests and delta represents the predetermined offset.

In some embodiments, the total completion time threshold for the user write request may be determined by specifically considering the completion times of the read requests and/or write-zero requests generated in response to each user write request, which may be represented as $Timeout_{watchdog} = N*T_{write\_max}+X*T_{read\_max}+Y*T_{zero\_max}$, where X represents the number of read requests generated for this user write request, $T_{real\_max}$ represents the predetermined completion time threshold set for a single write request, Y represents the number of write-zero requests generated for this user write request, and $T_{zero\_max}$ represents the predetermined time threshold set for a single write-zero request.

In some embodiments, the host control module 112 may determine the corresponding total completion time threshold for each user write request and monitor the completion indication for the write request generated for that user write request within this total completion time threshold. Additionally, it further monitors the completion indication for the read request and/or write-zero request generated for that user write request. If the completion indication of all the write requests (and/or read requests, write-zero requests) is received within this time threshold, the host control module 112 may determine that this user write request is not completed within the time threshold, and record that the completion speed of the user write request is low. If the host control module 112 monitors for a period of time that a large number of user write requests cannot be completed in the time threshold, then the host control module 112 may report a failure of the cache memory 122, for example, send an alert to the manager of the storage system 100.

By setting the total completion time threshold of each user write request more flexibly, the host control module 112 or host may determine more reasonably and accurately whether the cache memory or storage system raises the low reading and writing speed because of failure. If a certain or some user write requests induce(s) a large number of write requests for the cache control module 114 within a short period of time, then the host control module 112 or host may wait for a longer time such that these write requests can be completed by the cache control module 114.

Figure 7:
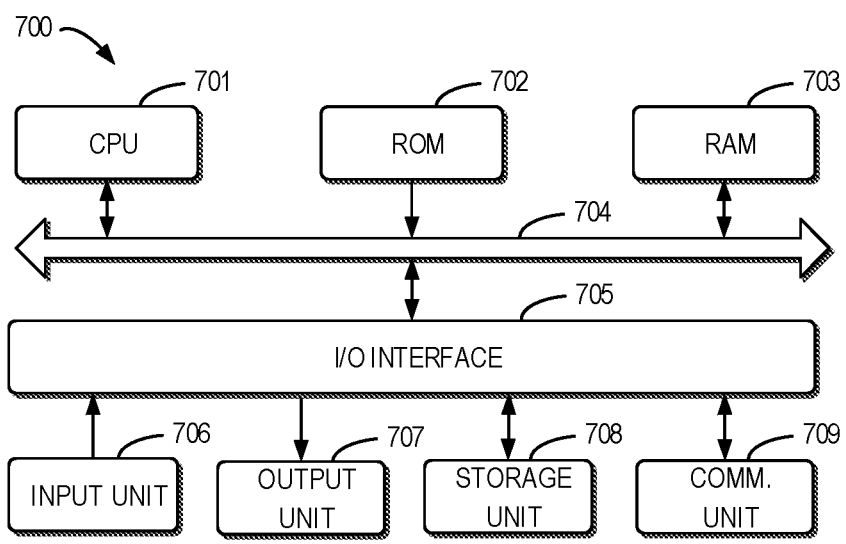
FIG. 7 is a block diagram illustrating an example device that can be used to implement embodiments of the present disclosure.

FIG. 7 is a schematic block diagram illustrating an example device 700 that can be used to implement embodiments of the present disclosure. The device 700 may be used to implement one or more control modules of the storage controller 110 in FIG. 1. As illustrated, the device 700 includes a central processing unit (CPU) 701 which can perform various suitable acts and processing based on the computer program instructions stored in a read-only memory (ROM) 702 or computer program instructions loaded into a random access memory (RAM) 703 from a storage unit 708. The RAM 703 also stores various types of programs and data required by operating the storage device 700. CPU 701, ROM 702 and RAM 703 are connected to each other via a bus 704 to which an input/output (I/O) interface 705 is also connected.

Various components in the apparatus 700 are connected to the I/O interface 705, including: an input unit 706, such as a keyboard, mouse and the like; an output unit 707, such as a variety of types of displays, loudspeakers and the like; a storage unit 708, such as a magnetic disk, optical disk and the like; and a communication unit 709, such as a network card, modem, wireless communication transceiver and the like. The communication unit 709 enables the apparatus 700 to exchange information/data with other devices via a computer network such as Internet and/or a variety of telecommunication networks.

The processing unit 701 performs various methods and processes as described above, for example, any of the process 200 to the process 600. For example, in some embodiments, any of the process 200 to the process 600 may be implemented as a computer software program or computer program product, which is tangibly included in a machine-readable medium, such as the storage unit 708. In some embodiments, the computer program can be partially or fully loaded and/or installed to the device 700 via ROM 702 and/or the communication unit 709. When the computer program is loaded to RAM 703 and executed by CPU 701, one or more steps of any of the process 200 to the process 600 described above are implemented. Alternatively, in other embodiments, CPU 701 may be configured to implement any of the process 200 to the process 600 in any other suitable manner (for example, by means of a firmware).

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of controlling write requests in a storage system, comprising:
    determining a size of a storage space in a first storage device that is allocated for a plurality of write requests, the plurality of write requests being issued by a control device of the storage system to store data into the first storage device and waiting to be completed;
    determining a predetermined release rate of releasing the data stored in the first storage device to a second storage device, an access speed of the first storage device being greater than that of the second storage device;
    determining a predetermined completion time of the plurality of write requests based on the size of the storage space and the predetermined release rate; and
    in response to the predetermined completion time exceeding a predetermined time threshold, transmitting a throttling indication to the control device such that the control device throttles issuing of a further write request for the first storage device.

2. The method of claim 1, further comprising:
    in response to the predetermined completion time exceeding the predetermined time threshold, selecting at least one write request from the plurality of write requests; and
    transmitting a completion indication for the at least one write request to the control device so as to enable the at least one write request to be completed.

3. The method of claim 2, wherein selecting the at least one write request comprises:
    selecting from the plurality of write requests at least one write request with a longer waiting time.

4. The method of claim 2, wherein transmitting the completion indication comprises:
    transmitting the completion indication together with the throttling indication to the control device.

5. The method of claim 2, wherein selecting the at least one write request comprises:
    in response to releasing at least a portion of data stored in the first storage device to the second storage device, determining a size of an available storage space of the first storage device; and
    in response to the size of the available storage space exceeding a size of a storage space allocated for the at least one write request, selecting the at least one write request.

6. The method of claim 1, wherein the first storage device comprises a cache, and determining the size of the storage space comprises:
   determining a number of miss cache pages in the cache for the plurality of write requests; and
   determining the size of the storage space based on the number of miss cache pages.

7. The method of claim 1, wherein determining the predetermined release rate comprises:
   obtaining a plurality of release rates of a plurality of data releases occurred from the first storage device to the second storage device;
   allocating a plurality of weights for the plurality of release rates based on occurrence times of the plurality of data releases, a release rate that is corresponding to a data release having a later occurrence time being allocated with a higher weight; and
   determine the predetermined release rate by weighting the plurality of release rates based on the plurality of allocated weights.

8. The method of claim 1, wherein the first storage device is operated in a write-back mode.

9. A method of controlling write requests in a storage system, comprising:
   transmitting a plurality of write requests for a first storage device, the plurality of write requests to be processed to store data into the first storage device and the first storage device releasing the stored data to a second storage device, an access speed of the first storage device being greater than that of the second storage device;
   in response to receiving a throttling indication, throttling issuing of a further write request for the first storage device;
   in response to receiving a user write request from a host, generating at least one of the plurality of write requests;
   determining a total completion time threshold for the user write request based on a number of the at least one generated write request and a predetermined time threshold, the predetermined time threshold indicating an upper limit of a completion time of a single write request; and
   monitoring a completion indication for the at least one write request within the total completion time threshold.

10. The method of claim 9, wherein throttling issuing of a further write request for the first storage device comprises:
   in response to receiving a completion indication for at least one of the plurality of write requests and a number of write requests among the plurality of write requests for which no completion indication is received being below a predetermined number threshold, transmitting the further write request for the first storage device.

11. An apparatus for controlling write requests in a storage system, comprising:
   a processor; and
   a memory coupled to the processor, the memory having instructions stored thereon which, when executed by the processor, cause the apparatus to perform acts comprising:
       determining a size of a storage space in a first storage device that is allocated for a plurality of write requests, the plurality of write requests being issued by a control device of the storage system to store data into the first storage device and waiting to be completed,
       determining a predetermined release rate of releasing the data stored in the first storage device to a second storage device, an access speed of the first storage device being greater than that of the second storage device,
       determining a predetermined completion time of the plurality of write requests based on the size of the storage space and the predetermined release rate, and
       in response to the predetermined completion time exceeding a predetermined time threshold, transmitting a throttling indication to the control device such that the control device throttles issuing of a further write request for the first storage device.

12. The apparatus of claim 11, wherein the acts further comprise:
   in response to the predetermined completion time exceeding the predetermined time threshold, selecting at least one write request from the plurality of write requests; and
   transmitting a completion indication for the at least one write request to the control device so as to enable the at least one write request to be completed.

13. The apparatus of claim 12, wherein selecting the at least one write request comprises:
   selecting from the plurality of write requests at least one write request with a longer waiting time.

14. The apparatus of claim 12, wherein transmitting the completion indication comprises:
   transmitting the completion indication together with the throttling indication to the control device.

15. The apparatus of claim 12, wherein selecting the at least one write request comprises:
   in response to releasing at least a portion of data stored in the first storage device to the second storage device, determining a size of an available storage space of the first storage device; and
   in response to the size of the available storage space exceeding a size of a storage space allocated for the at least one write request, selecting the at least one write request.

16. The apparatus of claim 11, wherein the first storage device comprises a cache, and determining the size of the storage space comprises:
   determining a number of miss cache pages in the cache for the plurality of write requests; and
   determining the size of the storage space based on the number of miss cache pages.

17. The apparatus of claim 11, wherein determining the predetermined release rate comprises:
   obtaining a plurality of release rates of a plurality of data releases occurred from the first storage device to the second storage device;
   allocating a plurality of weights for the plurality of release rates based on occurrence times of the plurality of data releases, a release rate that is corresponding to a data release having a later occurrence time being allocated with a higher weight; and
   determine the predetermined release rate by weighting the plurality of release rates based on the plurality of allocated weights.

18. The apparatus of claim 17, wherein the first storage device is operated in a write-back mode.

19. An apparatus controlling write requests in a storage system, comprising:

a processor; and a memory coupled to the processor, the memory having instructions stored thereon which, when executed by the processor, cause the apparatus to perform acts comprising:

transmitting a plurality of write requests for a first storage device, the plurality of write requests to be processed to store data into the first storage device and the first storage device releasing the stored data to a second storage device, an access speed of the first storage device being greater than that of the second storage device, in response to receiving a throttling indication, throttling issuing of a further write request for the first storage device, in response to receiving a user write request from a host, generating at least one of the plurality of write requests, determining a total completion time threshold for the user write request based on a number of the at least one generated write request and a predetermined time threshold, the predetermined time threshold indicating an upper limit of a completion time of a single write request, and monitoring a completion indication for the at least one write request within the total completion time threshold.

20. The apparatus of claim 19, wherein throttling issuing of a further write request for the first storage device comprises:

in response to receiving a completion indication for at least one of the plurality of write requests and a number of write requests among the plurality of write requests for which no completion indication is received being below a predetermined number threshold, transmitting the further write request for the first storage device.

21. A computer program product having a non-transitory computer readable medium which stores a set of instructions for controlling write requests in a storage system; the set of instructions, when carried out by computerized circuitry, causing the computerized circuitry to perform a method of:

determining a size of a storage space in a first storage device that is allocated for a plurality of write requests, the plurality of write requests being issued by a control device of the storage system to store data into the first storage device and waiting to be completed;

determining a predetermined release rate of releasing the data stored in the first storage device to a second storage device, an access speed of the first storage device being greater than that of the second storage device;

determining a predetermined completion time of the plurality of write requests based on the size of the storage space and the predetermined release rate; and in response to the predetermined completion time exceeding a predetermined time threshold, transmitting a throttling indication to the control device such that the control device throttles issuing of a further write request for the first storage device.

22. The computer program product of claim 21, wherein the method further includes:

in response to the predetermined completion time exceeding the predetermined time threshold, selecting at least one write request from the plurality of write requests; and transmitting a completion indication for the at least one write request to the control device so as to enable the at least one write request to be completed.

23. A computer program product having a non-transitory computer readable medium which stores a set of instructions for controlling write requests in a storage system; the set of instructions, when carried out by computerized circuitry, causing the computerized circuitry to perform a method of:

transmitting a plurality of write requests for a first storage device, the plurality of write requests to be processed to store data into the first storage device and the first storage device releasing the stored data to a second storage device, an access speed of the first storage device being greater than that of the second storage device;

in response to receiving a throttling indication, throttling issuing of a further write request for the first storage device;

in response to receiving a user write request from a host, generating at least one of the plurality of write requests;

determining a total completion time threshold for the user write request based on a number of the at least one generated write request and a predetermined time threshold, the predetermined time threshold indicating an upper limit of a completion time of a single write request; and monitoring a completion indication for the at least one write request within the total completion time threshold.

24. The computer program product of claim 23, wherein throttling issuing of a further write request for the first storage device comprises:

in response to receiving a completion indication for at least one of the plurality of write requests and a number of write requests among the plurality of write requests for which no completion indication is received being below a predetermined number threshold, transmitting the further write request for the first storage device.

* * * * *